UNITED STATES PATENT OFFICE.

CARL T. P. HANSEN, OF GLEN OLDEN, PENNSYLVANIA, ASSIGNOR OF ONE-HALF TO FRANK BERMAN, OF CHESTER, PENNSYLVANIA.

EXPLOSIVE AND PROCESS FOR MAKING SAME.

1,311,274.  Specification of Letters Patent.  Patented July 29, 1919.

No Drawing.  Application filed February 7, 1918. Serial No. 215,901.

*To all whom it may concern:*

Be it known that I, CARL T. P. HANSEN, a subject of the King of Denmark, residing at Glen Olden, in the county of Delaware and State of Pennsylvania, have invented certain new and useful Improvements in Explosives and Processes for Making Same, of which the following is a specification.

The object of this invention is to provide a new and improved explosive which possesses increased power, speed of ignition, and safety in handling.

A further object is to provide a process for uniting the ingredients comprising the preferred formula which is inexpensive to carry out, necessitating a minimum quantity of apparatus, and which also decreases to a minimum the ordinary danger incident to the handling of such highly explosive mixtures.

And a further object is to provide a relative proportion of the various ingredients comprising the preferred formula, which proportion at this time is believed to produce the best results, but which in certain specific instances can be slightly varied, either one way or the other, without vitally affecting the efficiency of the product as a perfect explosive.

With these and other objects in mind, the present invention in its preferred embodiment comprises broadly speaking the combination of ammonium-nitrate, potassium-nitrate, resin, sulfur, manganese-dioxid, a suitable form of starch, naphthalene, tallow or fat, potassium-permanganate, and sodium-chlorid.

In uniting the ingredients above referred to, it is only necessary to bring them together in finely divided states mechanically, omitting, however, the fat. This combination is mixed until the various ingredients forming a part thereof are thoroughly amalgamated, the mass being then preferably transferred to a porcelain receptacle together with the fat until now omitted, where they are all thoroughly and slowly heated until they reach the characteristic temperature at which said mass boils.

During this heating of the ingredients, they are continuously stirred until they are thoroughly mixed and all of the fat is dissolved and caused to impregnate the bulk of the mixture. The receptacle in which the union occurs may be heated in any suitable manner, as by means of a steam jacket or over an open fire.

Finally, after reaching the said boiling point, the liquid contents of said receptacle will begin to rise, but a continued stirring is maintained until the boiling mass attains a dark brownish color. The receptacle with its contents is then removed from the fire while the stirring of the mass is continued until the same falls again to its normal height within the receptacle and begins to stiffen, when it is poured into cooling-pans, after which, thoroughly cooled and hard, it is removed from these pans and pulverized in any suitable manner and to any desired degree of trituration. After this, the composite powder, or pulverized explosive substance may be put up in packages, molded in any well-known manner, or otherwise shipped as may be desired.

The exact proportion of the various substances used in the formula, hereinbefore recited, is preferably as follows: Ammonium-nitrate, 74%; potassium-nitrate, 11.4%; resin, 2.4%; sulfur, 3.6%; manganese-dioxid, 1.8%; starch, 1.54%; naphthalene, 1.2%; paraffin, 0.9%; fat, 1.9%; potassium-permanganate, 0.5%; and sodium-chlorid, 0.76%; but relatively slight changes may be made therein without materially affecting the effectiveness of the resulting compound explosively.

Having thus described my invention, what I claim and desire to protect by Letters Patent of the United States is:—

1. An explosive, comprising a mixture of ammonium-nitrate, potassium-nitrate, resin, sulfur, manganese-dioxid, starch, naphthalene, paraffin, tallow, potassium-permanganate, and sodium-chlorid.

2. An explosive, comprising the following substances in substantially the proportion of:—ammonium-nitrate, 74%; resin, 2.4%; potassium-nitrate, 11.4%; sulfur, 3.6%; manganese-dioxid, 1.8%; starch, 1.54%; naphthalene, 1.2%; paraffin, 0.9%; fat, 1.9%; potassium-permanganate, 0.5%; and sodium-chlorid, 0.76%.

3. The process of forming an explosive mixture by mechanically uniting ammonium-nitrate, potassium-nitrate, resin, sulfur, manganese-dioxid, starch, naphthalene, paraffin, potassium-permanganate, and sodium-chlorid, and heating this combination together with fat until the new combination reaches its characteristic boiling point, the fat is dissolved and the mass is thoroughly amalgamated.

4. The process of forming an explosive mixture by mechanically uniting ammonium-nitrate, potassium-nitrate, resin, sulfur, manganese-dioxid, starch, naphthalene, paraffin, potassium permanganate, and sodium chlorid; heating this combination together with fat until the fat is melted, the new combination reaches its characteristic boiling point, and the ingredients are thoroughly amalgamated; and then permitting said last-formed combination to cool and stiffen, after which the same is pulverized.

In testimony whereof I have affixed my signature.

CARL T. P. HANSEN.